United States Patent [19]

Fecher

[11] 4,377,105
[45] Mar. 22, 1983

[54] HYDRAULIC BRAKE BOOSTER

[75] Inventor: Douglas A. Fecher, Three Oaks, Mich.

[73] Assignee: The Bendix Corporation, Southfield, Mich.

[21] Appl. No.: 224,360

[22] Filed: Jan. 12, 1981

[51] Int. Cl.³ .............................................. F15B 13/10
[52] U.S. Cl. ...................................... 91/391 R; 91/6; 60/547.3
[58] Field of Search ..................... 91/391 R; 60/547 B; 91/6

[56] References Cited

U.S. PATENT DOCUMENTS 3,719,044 3/1973 Bach .................................. 60/547 B
3,751,912 8/1973 Bach .................................. 91/391 R

*Primary Examiner*—Paul E. Maslousky
*Attorney, Agent, or Firm*—Paul David Schoenle; Ken C. Decker

[57] ABSTRACT

A hydraulic brake booster includes a housing (22) with a control valve assembly (34) and a piston (30). The control valve assembly (34) carries a secondary valve assembly (56) including a pilot member (58) and a mounting ring (60). The secondary valve assembly controls communication of fluid pressure to the pressure chamber (24) via the control valve assembly (34).

5 Claims, 4 Drawing Figures

HYDRAULIC BRAKE BOOSTER

The invention relates to a hydraulic brake booster comprising a housing defining a pressure chamber and a piston is movable within the housing in response to fluid pressure communicated to the pressure chamber. The housing also movably supports a control valve assembly extending into the pressure chamber and operable to control communication of fluid pressure to the pressure chamber.

In the prior art hydraulic brake boosters, such as illustrated in U.S. Pat. No. 4,128,112, Brown et al., Dec. 5, 1978, the control valve assembly comprises a spool valve with an axially extending blind bore leading to a plurality of radially extending apertures. A sleeve with similar radially extending apertures is fitted over the spool valve so that fluid communication can be established via the apertures. The sleeve is movable relative to the spool valve to close communication via the apertures. Therefore, the clearance between the sleeve and spool valve is critical from a manufacturing standpoint to control fluid communication to and from the pressure chamber. When the sleeve moves to terminate communication through the apertures, the clearance must be substantially zero to prevent leakage between the sleeve and spool valve.

The present invention comprises a hydraulic brake booster with a housing defining a pressure chamber, a piston in a hydraulic brake booster, a housing defining a pressure chamber, a piston movable within the housing in response to fluid pressure communicated to the pressure chamber, a control valve assembly movably disposed within the housing to control communication of fluid pressure to the pressure chamber, the control valve assembly movably carrying a sleeve within the pressure chamber, an input member engageable with the sleeve to move the sleeve and control valve assembly and valve means carried by the control valve within the pressure chamber to open communication between the pressure chamber and a fluid pressure source, characterized by said valve means defining a first position in engagement with said sleeve to provide a first opening leading to the pressure chamber, said valve means defining a second position spaced from said sleeve to provide a second opening leading to the pressure chamber, said second opening being different in size than said first opening and said valve means defining a third position substantially closing communication to the pressure chamber.

By providing a valve means separate from the sleeve, the advantage offered by the present invention enables the manufacturer to relax the clearance tolerances required between the control valve and sleeve. Also, the leakage incurred with the sleeve overlapping the spool valve apertures is substantially reduced when the valve means is disposed in the third position.

One way of carryng out the invention is described in detail below with reference to the accompanying drawings which illustrate only one specific embodiment, in which.

Figure 1:
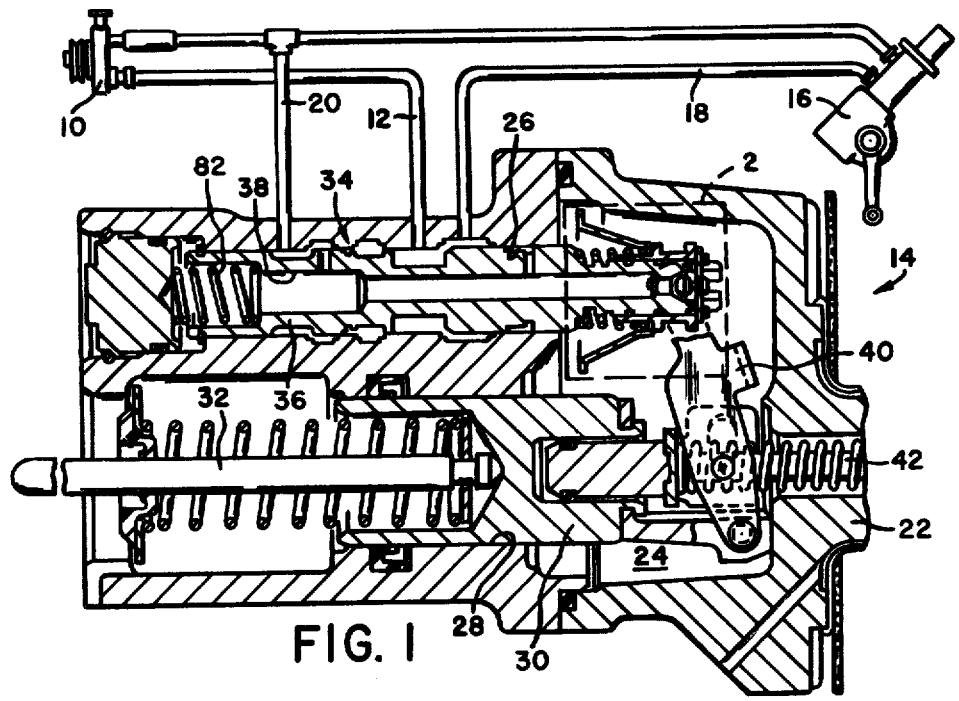
FIG. 1 is a schematic illustration of a vehicle brake system with a brake booster constructed in accordance with the present invention shown in cross-section.

The vehicle brake system includes a power steering pump 10 which is communicated via conduit 12 with a hydraulic brake booster 14. The booster 14 communicates with a steering gear 16 via conduit 18 and also communicates with the reservoir of the pump 10 via conduit 20. A booster housing 22 defines a pressure chamber 24 with a first bore 26 and a second bore 28 leading to the pressure chamber 24. A piston 30 is movably disposed within bore 28 and is responsive to fluid pressure within chamber 24 to move relative to the housing 22. An output member 32 moves with the piston to actuate a master cylinder (not shown) or other fluid pressure generator during braking. A control valve assembly 34 is movably disposed within bore 26. The conduits 12, 18 and 20 lead to passages within the housing 22 in a manner well known in the art so that these passages intersect the bore 26. The control valve 34 comprises a spool 36 with an axially extending bore 38 extending therethrough. The spool 36 includes bands and passages within the bore 26 to provide for fluid communication from the conduit 12 to the end of bore 38 leading to the pressure chamber 24. In order to control movement of the control valve assembly 34, an input lever 40 is coupled to an input member 42 and is adapted to impart movement to the control valve assembly in a manner hereinafter described.

Figure 2:
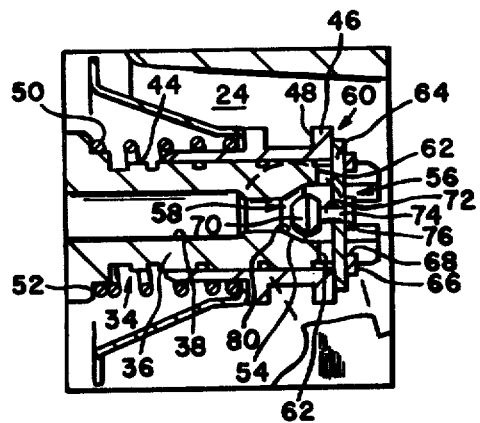
FIG. 2 is an enlarged view of the circumscribed portion 2 of FIG. 1.

Turning to FIG. 2, the spool 36 includes a reduced diameter portion 44 at one end which is disposed within the chamber 24. A sleeve 46 is movably carried on the portion 44. The sleeve forms a pocket 48 for receiving and attachment with the input lever 40. A spring 50 extends between a spool shoulder 52 and the sleeve 46 to bias the latter to the right in FIG. 2. The bore 38 is stepped at the portion 44 to form a seat 54 and a secondary valve assembly 56 is carried by the control valve 34 within the pressure chamber 24. The secondary valve assembly comprises a pilot member 58 opposing the seat 54 and disposed within the bore 38, and a mounting ring 60. The end of spool 36 within pressure chamber 24 is provided with four slots 62 and the mounting ring 60 is provided with four arms 64 extending into the slots 62. A retaining ring 66 is releasably disposed within a recess 68 at the end of spool 36 to prevent separation of the secondary valve assembly from the spool 36. The pilot member 58 includes a ball 70 engageable with the seat 54 and a stem 72 extending toward the open end of bore 38 within pressure chamber 24. The stem is loosely received within a central opening 74 on the mounting ring 60 to permit axial movement between the pilot member and mounting ring. The stem is also flattened at 76 to the right of mounting ring 60 to form the mounting ring and pilot member as a unitary assembly.

In a first position illustrated in FIG. 2, the spring 50 biases the sleeve 46 against the mounting ring 60 so that the latter is in engagement with the retaining ring 66. In this position, the mounting ring 60 disposes the ball 70 of pilot member 58 in spaced relation to the seat 54 to define a first passage or opening 80 between the ball 70 and seat 54. The first position defines the rest condition or the release condition during termination of braking. The dimension of the first passage 80 is such that the communication of fluid pressure from the pressure chamber 24 to the return conduit 20, via slot 62, passage 80, bore 38, a spool radial opening shown in FIG. 1 and bore 26, is controlled to a predetermined rate.

Figure 3:
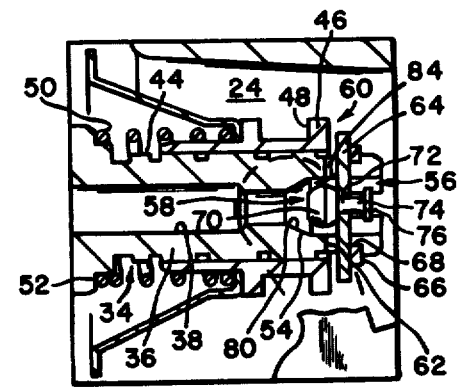
FIG. 3 is a view similar to FIG. 2 showing the portion in a reserve or power failure position.

If a brake application is initiated, the lever 40 is pivoted counterclockwise to move the sleeve 46 and control valve 34 to the left. The fluid pressure within bore 38 is increased so that the ball 70 is moved to the right relative to the seat 54 and the mounting ring 60. Also, the control valve return spring 82 opposes further movement of the spool 36 so that the spring 50 is contracted to separate the sleeve 46 from the mounting ring 60. This condition is shown in FIG. 3 and is referred to as a second position wherein the sleeve 46 is separated from the secondary valve assembly and the pilot member is moved to a new position relative to the mounting ring. In the second position, the ball 70 defines a second passage or opening 84 between the seat 54 and the ball 70. The second passage 84 is larger than the first passage 80 so that communication of fluid pressure from the bore 38 to the pressure chambaer 24 is substantially unrestricted via the opening 84 and the slots 62 or the spacing between arms 64.

Figure 4:
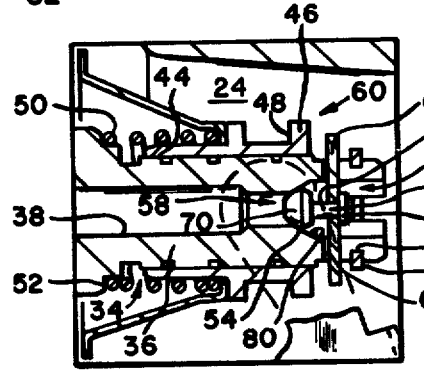
FIG. 4 is a view similar to FIG. 2 showing the portion in a reserve or power failure position.

If the fluid pressure communicated to the pressure chamber 24 is insufficient to move the piston 30 either because of a leak in the conduits or a power failure of the pump 10, the lever 40 is further pivoted to open an accumulator (not shown) with stored fluid pressure to the pressure chamber. This accumulator can be located either within the piston 30 or located outside the housing. With fluid pressure communicated to the pressure chamber via an accumulator, the pilot member 58 and mounting ring 60 are biased to move to the left so that the ball 70 of pilot member 58 is engaged with the seat 54. This condition is shown in FIG. 4 and is referred to as a third position. In the third position, the sleeve 46 remains spaced from the secondary assembly so that the mounting ring 60 and the pilot member 58 are free to move in response to a pressure differential between chamber 24 and bore 38 to a position engaging the pilot member 58 with the seat 54. In the third position, the pressure chamber 24 is closed to the bore 38.

Because the communication of fluid pressure from the control valve bore 38 to the pressure chamber 24 is controlled by a secondary valve assembly 56, the sleeve 46 can be constructed to loosely slide over portion 44. The clearance between the sleeve 46 and the portion 44 is not relied upon to provide fluid communication between the bore 38 and the pressure chamber 24 as taught in the prior art.

I claim:

1. In a hydraulic brake booster, a housing defining a pressure chamber, a piston movably disposed within the housing in response to fluid pressure communicated to the pressure chamber from a fluid pressure source, a control valve assembly movably disposed within the housing to control communication of said fluid pressure to the pressure chamber, the control valve assembly movably carrying a sleeve within the pressure chamber, an input member engageable with the sleeve to move the sleeve and control valve assembly and valve means carried by the control valve assembly within the pressure chamber to open communication between the pressure chamber and said fluid pressure source, characterized by said valve means defining a first position in engagement with said sleeve to provide a first opening leading to the pressure chamber, said valve means defining a second position spaced from said sleeve to provide a second opening leading to the pressure chamber, said second opening being different in size than said first opening and said valve means defining a third position substantially closing communication to the pressure chamber.

2. The hydraulic brake booster of claim 1 characterized by a resilient member extending between the sleeve and control valve assembly to bias the sleeve to a rest position and said resilient member also biases said valve means to said first position via the sleeve.

3. The hydraulic brake booster of claim 1 characterized by said valve means comprising a mounting ring movably carried on the control valve assembly and engageable with the sleeve in said first position and a pilot member carried on said mounting ring, said pilot member cooperating with said control valve assembly to substantially define said first and second openings and said pilot member being engageable with said control valve assembly in said third position.

4. The hydraulic brake booster of claim 3 characterized by said pilot member being movably mounted on said mounting ring.

5. The hydraulic brake booster of claim 3 characterized by said control valve assembly including an axially extending opening leading to the pressure chamber at one end of said control valve assembly, said one end including slots to movably receive said mounting ring and a snap ring is coupled to said one end to releasably attach said mounting ring and said pilot member to said control valve assembly.

* * * * *